US007367416B2

(12) United States Patent
Seufert et al.

(10) Patent No.: US 7,367,416 B2
(45) Date of Patent: May 6, 2008

(54) DRIVE TRAIN FOR A MOTOR VEHICLE AND METHOD FOR STARTING AN INTERNAL COMBUSTION ENGINE AND METHOD FOR GENERATING ELECTRIC CURRENT

(75) Inventors: Martin Seufert, Steinheim (DE); Hannes Kiessling, Steinheim (DE); Reinhard Schaarschmidt, Illingen (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 144 days.

(21) Appl. No.: 11/112,229

(22) Filed: Apr. 22, 2005

(65) Prior Publication Data

US 2005/0279543 A1    Dec. 22, 2005

Related U.S. Application Data

(63) Continuation of application No. PCT/EP03/11349, filed on Oct. 14, 2003.

(30) Foreign Application Priority Data

Oct. 25, 2002   (DE)  ................................ 102 50 853

(51) Int. Cl.
*H02P 15/00* (2006.01)
(52) U.S. Cl. ..................... 180/65.3; 903/946; 477/8; 477/167

(58) Field of Classification Search ............... 180/65.3; 903/909, 946; 477/8, 167
See application file for complete search history.

(56) References Cited

U.S. PATENT DOCUMENTS 5,337,848 A * 8/1994 Bader ..................... 180/65.2

(Continued)

FOREIGN PATENT DOCUMENTS

DE        295 02 906 U1     6/1995

(Continued)

OTHER PUBLICATIONS (2000). Starter-Generator mit Asynchron-maschine und feldorientierter Regelung. Special edition ATZ/MTZ, pp. 44-46.

(Continued)

*Primary Examiner*—Jeff Restifo
(74) *Attorney, Agent, or Firm*—Knobbe, Martens, Olson & Bear LLP

(57) ABSTRACT

A drive train is proposed for a motor vehicle which is driven by an internal combustion engine, having a single friction clutch which has an input element and an output element, wherein the input element is to be connected to a crankshaft of the internal combustion engine; a step-by-step variable speed transmission which has an input shaft connected to the output element of the friction clutch; and an electric machine which can be connected via a clutch to an output shaft of the step-by-step variable speed transmission in order to be able to apply traction force to the output shaft when the friction clutch is opened or closed, and which can be connected as a starter generator to the crankshaft in order to start the internal combustion engine or be driven by the internal combustion engine. The electric machine can be connected fixed in terms of rotation to the crankshaft while bypassing the friction clutch in order, in this way, to start the internal combustion engine when the friction clutch is opened or to be driven by the internal combustion engine.

17 Claims, 5 Drawing Sheets

U.S. PATENT DOCUMENTS

| | | | |
|---|---|---|---|
| 5,655,990 A * | 8/1997 | Ooyama et al. | 477/15 |
| 5,856,709 A * | 1/1999 | Ibaraki et al. | 290/45 |
| 6,250,270 B1 * | 6/2001 | Ahner et al. | 123/179.3 |
| 6,302,227 B1 | 10/2001 | Takemura et al. | |
| 6,394,924 B1 * | 5/2002 | Schiebold et al. | 475/5 |
| 6,432,023 B1 * | 8/2002 | Ahner et al. | 477/5 |
| 6,557,656 B2 * | 5/2003 | Haniu et al. | 180/65.6 |
| 6,591,705 B1 * | 7/2003 | Reik et al. | 74/343 |
| 6,634,247 B2 * | 10/2003 | Pels et al. | 74/329 |
| 6,695,082 B2 * | 2/2004 | Bitsche et al. | 180/65.2 |
| 6,722,230 B2 * | 4/2004 | Sakamoto et al. | 74/661 |
| 6,740,002 B1 * | 5/2004 | Stridsberg | 477/14 |
| 6,890,284 B2 * | 5/2005 | Sakamoto et al. | 477/109 |
| 7,082,850 B2 * | 8/2006 | Hughes | 74/329 |
| 7,175,555 B2 * | 2/2007 | Kozarekar et al. | 475/5 |
| 7,185,722 B1 * | 3/2007 | Sakamoto et al. | 180/65.2 |
| 2002/0177504 A1 * | 11/2002 | Pels et al. | 477/3 |

FOREIGN PATENT DOCUMENTS

| | | |
|---|---|---|
| DE | 199 41 705 A1 | 3/2000 |
| DE | 199 45 473 A1 | 4/2000 |
| DE | 199 31 770 A1 | 1/2001 |
| DE | 199 60 621 A1 | 6/2001 |
| DE | 101 33 695 A1 | 3/2002 |
| DE | 102 03 514 A1 | 8/2003 |
| EP | 0 916 546 A2 | 5/1999 |
| EP | 1 138 938 A2 | 10/2001 |

OTHER PUBLICATIONS

Bosch. Kraftfahr-technisches Taschenbuch. print run 24, p. 932.

Fischer, Robert Dr. (2004). "Integration automatisierter Schaltgetriebe mit E-Maschine." Conference transcript to conference, "E-Maschine im Antriebsstrang."

Reik, Wolfgang Dr. (1999). "Mögliche Anordnung des Startergenerators im Antriebsstrang." Conference transcript to conference, "E-Maschine im Antriebsstrang."

* cited by examiner

DRIVE TRAIN FOR A MOTOR VEHICLE AND METHOD FOR STARTING AN INTERNAL COMBUSTION ENGINE AND METHOD FOR GENERATING ELECTRIC CURRENT

CROSS REFERENCE TO RELATED APPLICATIONS

This application is a continuation of International Application PCT/EP03/11349, which application is hereby incorporated by reference in its entirety.

BACKGROUND OF THE INVENTION

1. Field of the Invention

The present invention relates to a drive train for a motor vehicle which is driven by an internal combustion engine, having:
- an individual friction clutch which has an input element and an output element, wherein the input element is to be connected to a crankshaft of the internal combustion engine;
- a step-by-step variable speed transmission which has an input shaft, a multiplicity of wheel sets corresponding to a multiplicity of gear speeds, and an output shaft, wherein the input shaft is connected to the output element of the friction clutch; and
- an electric machine which can be connected via a clutch to the output shaft of the step-by-step variable speed transmission in order to be able to apply traction force to the output shaft of the step-by-step variable speed transmission when the friction clutch is opened or closed, and which can be connected as a starter generator to the crankshaft in order to start the internal combustion engine or be driven by the internal combustion engine.

The present invention also relates to a method for starting an internal combustion engine of a motor vehicle and for initiating the starting up of the motor vehicle.

Finally, the present invention relates to a method for generating electric current while the motor vehicle is stationary by means of an electric machine which is driven by an internal combustion engine of a vehicle.

2. Description of Related Art

It has been known for a long time to integrate an electric machine into the drive train of a motor vehicle which is driven by an internal combustion engine. In this context, the functions of starting the internal combustion engine and generating current for the on-board electric system are conventionally implemented by means of two separate electric machines, the starter and the dynamo (generator), respectively.

For on-board electric systems of the motor vehicle with relatively high rated voltages (for example 42 volts on-board electric system) the possibility of providing an electric machine as a starter generator between the internal combustion engine and friction clutch is generally also considered. When the friction clutch is opened, the electric machine can be operated as a motor for starting the internal combustion engine. When the internal combustion engine is running, the electric machine can be used as a generator for feeding the on-board electric system. Cf. Bosch Kraftfahrtechnisches Taschenbuch [Bosch Motor Vehicle Handbook], 24th edition, page 932.

An electric machine in the drive train can also be used for other functions.

For example it is known to use the electric machine as a "booster" when there is a desire by the driver for high acceleration so that the performance of the internal combustion engine and the performance of the electric machine are added at the output.

In addition it is possible to convert the centrifugal energy (inertia) remaining when the vehicle is braked or when the engine is switched off into electrical energy (recuperation). The energy which is acquired in this way can be used to support the starting up process.

In addition it is known to assign an electric machine to the output side of the transmission so that when changing the gear speed the electric machine can be used to apply traction force to the output shaft of the transmission during phases when the friction clutch is opened. This brings about boosting of the traction force, which is applied in particular in what is referred to as automated manual shift transmissions.

Active synchronization is another function of an electric machine in the drive train. In such a case the electric machine is connected to at least one transmission shaft of a step-by-step variable speed transmission and is used to brake or accelerate the shaft for the purpose of synchronization with the clutch of a gear speed which is to be engaged. In this embodiment, it is possible to dispense with mechanical synchronization at least for some clutches so that the clutches can be embodied as simple claw clutches or the like.

Finally it is also known that switching off the internal combustion engine in the stationary state (for example at traffic lights) and not restarting until there is a desire to drive off offers considerable potential for saving fuel.

Consequently, a function which is desired for integrated electric machines is the supporting of such direct starting after the internal combustion engine has been switched off.

The document "Mögliche Anordnung des Startergenerators im Antriebsstrang [Possible arrangement of the starter generator in the drive train]" by Dr.-Ing. Wolfgang Reik, Tagungsband zur Fachtagung "E-Maschine im Antriebsstrang" [Conference papers at the specialist conference "The electric machine in the drive train"], Apr. 9, 1999, discloses an overview of the possible arrangements of an electric machine in the drive train and the advantages and disadvantages which are associated with the respective arrangement.

For example, a connection of the electric machine to the crankshaft of the internal combustion engine has the advantage that a direct start is possible, but the traction force cannot be boosted.

An arrangement between the friction clutch and transmission has the advantage that recuperation is possible but both a direct start and boosting of the traction force are impossible.

An electric machine which is arranged in the transmission permits both boosting of the traction force and recuperation but frequently does not allow the electric machine to be operated as a starter generator since generally not only the friction clutch but also at least one of the clutches of the step-by-step variable speed transmission have to be closed in order to drive the internal combustion engine.

"Integration automatisierter Schaltgetriebe mit E-Maschine [Integration of automated transmissions with an electric machine]" by Dr. Robert Fischer et al., Tagungsband zur Fachtagung "E-Maschine im Antriebsstrang [Conference papers for the specialist conference "The electric machine in the drive train"], Apr. 9, 1999, discloses that an electric machine is to be arranged in the drive train in such a way that it can be connected, on the one hand, to the output shaft of the step-by-step variable transmission via a clutch and, on the other hand, to the transmission input shaft via a clutch (referred to below as the "Fischer solution"). This arrangement is considered to be particularly favorable since it permits starter generator operation, recuperation and load shifting with boosting of the traction force.

This variant of the prior art has been used to form the preamble of claim 1.

An example of a drive train in which an electric machine is connected to a shaft of the step-by-step variable speed transmission is known from DE 199 31 770 A1.

Instead of a synchronization device, the clutch for the third gear speed is embodied as a friction clutch.

DE 199 60 621 A1 discloses a hybrid drive for vehicles, in which a step-by-step variable speed transmission is divided into two component transmissions. One of the component transmissions is connected to an electric machine. The other component transmission can optionally have a drive connection to an internal combustion engine and/or to the electric machine. The output shaft of the electric machine is connected to a shaft of the step-by-step variable speed transmission.

DE 295 02 906 U1 also discloses a hybrid drive wherein the rotor of an electric machine is rotatably mounted on the crankshaft of the internal combustion engine. The rotor can be connected to the crankshaft by means of a first separating clutch. The rotor can be connected to a transmission input shaft by means of a second separating clutch.

Finally, DE 101 33 695 A1 discloses a double clutch transmission which has two component transmissions. At least one of the transmissions can be connected to an electric machine.

SUMMARY OF THE INVENTION

Against the background above, the problem on which the present invention is based is to specify an improved drive train for a motor vehicle, an improved starting method for an internal combustion engine and an improved method for generating electric current.

This object is achieved with the drive train mentioned at the beginning in that the electric machine can be connected fixed in terms of rotation to the crankshaft while bypassing the friction clutch in order, in this way, to start the internal combustion engine or be driven by the internal combustion engine when the friction clutch is opened.

In addition, the object above is achieved by means of a method for starting an internal combustion engine of a motor vehicle and for initiating the driving off of the motor vehicle, wherein the crankshaft of the internal combustion engine is connected to an input element of an individual friction clutch of a drive train whose output element is connected to an input shaft of a step-by-step variable speed transmission, and wherein the drive train has an electric machine which can be connected both to the output shaft of the step-by-step variable speed transmission and also directly to the crankshaft, having the steps which take place in response to a start request signal:

a) connection of the electric machine to the crankshaft while bypassing the friction clutch;

b) opening of the friction clutch if it is not yet opened;

c) engagement of a gear speed of the step-by-step variable speed transmission which is suitable for driving off if said gear speed has not yet been engaged;

d) starting up of the electric machine so that the internal combustion engine can be started;

e) starting of the internal combustion engine; and f) closing of the friction clutch in order to drive off the motor vehicle.

In this context, steps b) and c) can each be carried out before or after step a). Step d) can be carried out simultaneously with step c).

Finally, the object above is achieved by means of a method for generating electric current while the motor vehicle is stationary by means of an electric machine which is driven by an internal combustion engine of a motor vehicle, wherein the crankshaft of the internal combustion engine is connected to an input element of an individual friction clutch of a drive train whose output element is connected to an input shaft of a step-by-step variable speed transmission, and wherein the drive train has an electric machine which can be connected both to the output shaft of the step-by-step variable speed transmission and also directly to the crankshaft, having the steps:

i) opening of the friction clutch if it is not yet opened;

ii) engagement of a gear speed of the step-by-step variable speed transmission which is suitable for driving off if said gear speed has not yet been engaged;

iii) connection of the electric machine to the crankshaft while bypassing the friction clutch so that the electric machine operates as a generator.

The measure which allows the electric machine to be connected directly to the crankshaft permits the drive train according to the invention to start the internal combustion engine or to operate the electric machine in the generator mode without the friction clutch having to be closed.

As a result, with the drive train according to the invention not only the functions of the electric machine as a starter generator and for boosting the traction force are possible. Instead, as a result of the direct connection to the crankshaft when the friction clutch is opened it is possible to engage a gear speed in the step-by-step variable speed transmission for starting up before or during the starting of the internal combustion engine. When the internal combustion engine starts, the friction clutch can be closed in order to initiate a starting up process directly (referred to as direct start).

Correspondingly it is possible, when the vehicle is stationary and the internal combustion engine is running, to keep the friction clutch open with the gear speed engaged and nevertheless drive the electric machine for the purpose of feeding the on-board electric system via the crankshaft.

Similarly, the ability to connect the electric machine directly to the crankshaft makes it possible, when the friction clutch is closed, to apply drive power to the transmission input shaft (for example as a "booster") or to additionally convert centrifugal energy into electric energy (recuperation) during overrun conditions.

Of course, the drive train according to the invention is in particular an automated drive train in which the essential functions of the step-by-step variable speed transmission and of the friction clutch are activated by actuators.

In addition, the drive train is to be suitable in particular for motor vehicles in which the internal combustion engine is the main engine and the electric machine merely carries out additional functions and does not constitute an equivalent drive source.

The method according to the invention for starting an internal combustion engine and for initiating the driving off of the motor vehicle allows considerable time to be saved in comparison with known methods. This increases the comfort.

In such drive trains according to the prior art (Fischer solution) in which the electric motor can alternatively be connected to the transmission output shaft or the transmission input shaft, the direct start or the start/stop function of the drive train, for example, cannot be implemented in such a convenient way. In such cases, the electric machine must start the internal combustion engine when the friction clutch is closed, while the clutches of the step-by-step variable speed transmission have to be opened. The friction clutch must subsequently be opened again and the driving-off gear engaged, for which purpose the still rotating drive shaft of the transmission has to be synchronized until the stationary state. Subsequently, the friction clutch can only be closed again in order to drive off. On a gradient there is the risk of the vehicle rolling back, and thus the need for a "hill holder".

The arrangement according to the prior art (Fischer solution) is equally disadvantageous in the generator operating mode when the vehicle is in a stationary state. If the electric machine is to be operated as a generator when the internal combustion engine is running in the stationary state of the vehicle, the engaged gear must firstly be disengaged and the friction clutch closed. If the vehicle is then to be driven off, the friction clutch must firstly be opened again and the driving-off gear speed engaged, for which purpose the still rotating drive shaft has to be decelerated (synchronized) to the stationary state. Only then can the friction clutch be closed again for the purpose of driving off.

These disadvantages can be avoided by means of the methods according to the invention. The driving-off process can be carried out more quickly in both operating modes, which contributes to the acceptance of the entire system. In particular, the driver will not sense any difference in comparison with a normal vehicle. In the case of the generator operating mode when the vehicle is stationary it is even possible to provide a creep function (hill holder function) as a type of "driving-off assistant" by means of the friction clutch.

According to one preferred embodiment of the drive train according to the invention the electric machine is arranged outside a housing of the step-by-step variable speed transmission and has an output shaft which extends into the interior of the housing via a shaft seal.

In this embodiment it is not necessary to seal the electric machine specially since it is arranged outside the transmission housing. The output shaft of the electric machine can then be connected to the output shaft of the step-by-step variable speed transmission or the crankshaft inside the transmission housing. For example conventional shift clutches can then be used for this purpose.

It is particularly preferred here if the output shaft of the electric machine is arranged parallel to the output shaft of the step-by-step variable speed transmission.

In this context, the installation space which is available for the drive train in the vehicle can be used particularly favorably.

In addition, in this embodiment it is preferred if the output shaft of the electric machine can be connected to the output shaft of the step-by-step variable speed transmission via a wheel set and a shift clutch.

The technology for connecting the electric machine to the output shaft of the step-by-step variable speed transmission can accordingly be implemented by means of standardized elements, which can thus be manufactured cost-effectively, in the interior of the step-by-step variable speed transmission.

It is particularly advantageous here if the shift clutch is a synchronized clutch.

In this way it is possible to connect the electric machine largely without jolting even when there are differences in rotational speeds compared to the output shaft of the step-by-step variable speed transmission.

According to a further preferred embodiment, the output shaft of the electric machine is arranged parallel to the crankshaft of the internal combustion engine.

This arrangement allows the connection of the electric machine both to the output shaft of the step-by-step variable speed transmission and to the crankshaft to be implemented in a structurally favorable fashion.

In addition it is advantageous if the output shaft of the electric machine can be connected to the crankshaft via a shift clutch and if the shift clutch is arranged inside the housing of the step-by-step variable speed transmission.

In this embodiment it is also particularly favorable that a standardized and maintenance-free shift clutch can be arranged in the interior of the transmission housing in order to bring about a shiftable connection to the crankshaft. In other words it is not necessary to provide shifting means, which require particular maintenance or encapsulation, outside the transmission.

It is also considered advantageous if the connection between the output shaft of the electric machine and the crankshaft is made via a shaft which is arranged parallel to the input shaft of the step-by-step variable speed transmission.

In this embodiment it is possible to arrange the separate shaft in a structurally favorable fashion so that a larger amount of free space is provided for the arrangement of the electric motor, in particular on the outside of the transmission housing.

Of course, when the shift clutch is arranged in the interior of the transmission housing the separate shaft emerges from the transmission housing via a shaft seal in order to implement a connection to the crankshaft.

According to one alternative preferred embodiment, the connection between the output shaft of the electric machine and the crankshaft is made via a rotational element which is arranged concentrically with respect to the input shaft of the step-by-step variable speed transmission.

It is particularly favorable here that there is no provision here of a shaft on the outside of the transmission in the limited installation space between the step-by-step variable speed transmission and the crankshaft, so that the installation space is not significantly increased in the radial direction.

It is particularly preferred if the rotational element is embodied as a hollow shaft which is connected to the input element of the friction clutch and is arranged around the input shaft of the step-by-step variable speed transmission.

In this embodiment, the connection of the rotational element to the output shaft of the electric machine can be particularly favorably embodied in the interior of the housing of the step-by-step variable speed transmission. In particular, a short axial overall length of the housing of the step-by-step variable speed transmission is obtained.

Alternatively it is advantageous if the input shaft of the step-by-step variable speed transmission is embodied as a hollow shaft and if the rotational element is mounted as a shaft inside the input shaft.

In this embodiment the rotational element can be connected in a particularly simple way to the input element of the friction clutch.

According to one further alternative preferred embodiment, the rotational element is embodied as a ring gear which is sealed with respect to the housing of the step-by-step variable speed transmission by means of a shaft seal, and is connected fixed in terms of rotation to the crankshaft by means of at least one driver which is connected to the input element of the friction clutch.

It is advantageous here that the friction clutch and its actuators can remain largely unchanged, with the exception of the driver which is mentioned.

It is particularly advantageous here if the connection between the output shaft of the electric machine and the ring gear is made via at least one flexible drive mechanism.

The flexible drive mechanism may be, for example, a belt drive or a chain drive. This measure allows a saving in weight in comparison with gear wheel connections. In addition, the radial overall size of the transmission can be limited by this means.

In this context, the installation space which is present can be favorably utilized by virtue of the concentric arrangement of the ring gear with respect to the input shaft of the step-by-step variable speed transmission.

In addition it is advantageous overall if the output shaft of the electric machine can be alternatively connected to the crankshaft or the output shaft of the step-by-step variable speed transmission by means of a shift clutch package.

In this way, the electric machine can be switched over from the starter/generator operating mode into the power boosting operating mode by means of a compact arrangement.

It is particularly advantageous here if the shift clutch package can additionally be switched into the idling state so that the output shaft of the electric machine idles.

As a result it is possible, for example, to drive the electric machine independently of the operating state of the step-by-step variable speed transmission as a motor for secondary assemblies.

Of course, the features which are mentioned above and which are to be explained below can be used not only in the respectively specific combination but also in other combinations or in isolation, without departing from the scope of the present invention.

BRIEF DESCRIPTION OF THE DRAWINGS

Exemplary embodiments of the invention are illustrated in the drawing and will be explained in more detail in the following description. In said drawing.

DETAILED DESCRIPTION OF THE PREFERRED EMBODIMENTS

Figure 1:
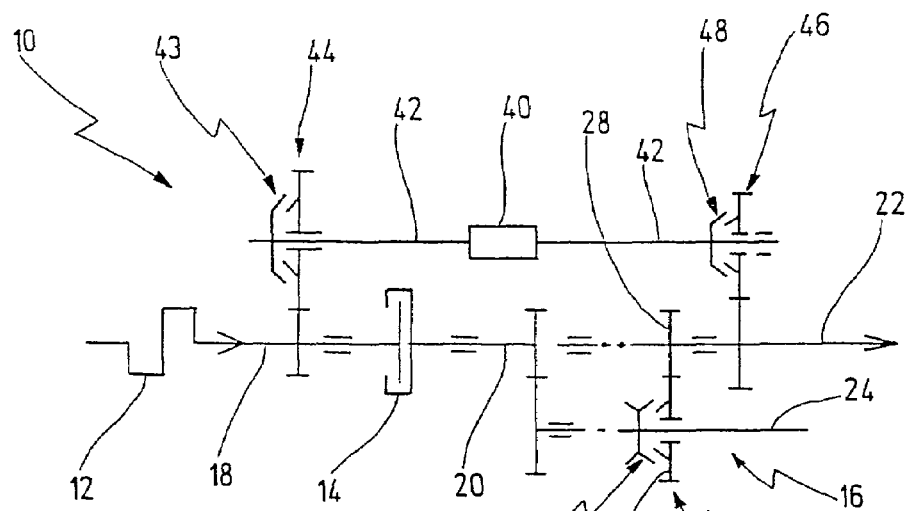
FIG. 1 shows the schematic layout of a first embodiment of the drive train according to the invention.

In FIG. 1, a first embodiment of a drive train according to the invention is designated generally by 10.

The drive train 10 can be mounted in a motor vehicle (not illustrated in more detail) which is driven by an internal combustion engine 12.

The drive train 10 has a friction clutch 14 and a step-by-step variable speed transmission 16.

The friction clutch 14 is embodied as a driving-off and separating clutch and is usually in the form of a dry clutch. It can however also be embodied as a wet clutch.

An input element of the friction clutch 14 is connected to a crankshaft 18 of the internal combustion engine 12. An output element of the friction clutch 14 is connected to an input shaft 20 of the step-by-step variable speed transmission 16.

An output shaft 22 of the step-by-step variable transmission 16 is connected to drive wheels of the motor vehicle via a differential gear (not illustrated).

The step-by-step variable speed transmission 16 is embodied as a cylindrical gear mechanism with a countershaft 24 which is arranged parallel to the output shaft 22 in a design which is conventional per se.

The step-by-step variable speed transmission 16 also has a multiplicity of wheel sets corresponding to a multiplicity of gear speeds, only one wheel set 26 of which is shown in FIG. 1 for reasons of clear illustration.

The wheel set 26 has a fixed wheel 28 which is connected fixed in terms of rotation to the output shaft 22, and a loose wheel 30 which is rotatably mounted on the counter-shaft 24.

A schematically shown shift clutch 32 is used for optionally connecting the loose wheel 30 to the countershaft 24. The shift clutch 32 may be embodied as a synchronizing clutch. However, it may also be a non-synchronized claw clutch or the like.

In addition, the drive train 10 has an electric machine 40.

An output shaft 42 of the electric machine 40 is connected to the crankshaft 18 of the internal combustion engine 12 via a shiftable wheel set 44. A shift clutch 43, which may be arranged, for example, on the output shaft 42, is used to connect and/or disconnect the crankshaft 18.

In addition, the output shaft 42 of the electric machine 40 is connected via a shiftable wheel set 46 to the output shaft 22 of the step-by-step variable speed transmission 16. For this purpose, a shift clutch 48 is provided on the output shaft 42, said shift clutch 48 being configured so as to connect the wheel set 46 to the output shaft 42 of the electric machine 40 in a positively locking fashion.

The electric machine 40 can be operated as a starter generator via the connection to the crankshaft 18. In order to start the internal combustion engine 12, the shift clutch 43 is closed and the shift clutch 48 is opened and the friction clutch 14 is also opened. The electric machine is then operated as a motor in order to drive and start the internal combustion engine 12.

When the internal combustion engine 12 is running, the electric machine 40 is operated as a generator and has the purpose of supplying voltage to the on-board electric system of the motor vehicle and/or of charging a battery (not illustrated in more detail) of the vehicle.

When changing gear speeds, the electric machine 40 can be used for boosting the traction force. In this case, the shift clutch 43 is released and the shift clutch 48 is closed. While the friction clutch 14 for disengaging the source gear speed and engaging the target gear speed is opened, the electric machine 40 can be operated as a motor in order thus to apply traction force to the output shaft 22 of the step-by-step variable speed transmission 16.

In addition, the electric machine 40 can be used as a "booster" when the gear speed is engaged and the friction clutch 14 is closed, in order to increase the output power at the transmission output shaft 22. The booster operating mode can take place when the shift clutch 48 is closed or else when the shift clutch 43 is closed. In the latter case, a moment flux occurs via the respectively selected gear speed. This is possibly advantageous in particular in the lower gear speeds.

Owing to the possibility of directly connecting the output shaft 42 of the electric machine 40 to the crank-shaft 18, it is possible to start the internal combustion engine 12 when the friction clutch 14 is opened. Of course, in this case the shift clutch 48 must also be opened.

This means that a gear speed for the driving-off process can already be engaged in the step-by-step variable speed transmission 16. After the internal combustion engine 12 starts, the friction clutch 14 can then be closed immediately in order to initiate the driving-off process. If appropriate, the process of starting the internal combustion engine 12 and of closing the friction clutch 14 can also be carried out in overlapping fashion.

In addition, the electric machine 40 can be used under overrun conditions of the internal combustion engine 12 in order to recover energy (recuperation), for which purpose the clutch 43 is opened and the clutch 48 is closed.

It is also possible to operate the electric machine 40 as a generator when the internal combustion engine 12 is running in the stationary state. In this case, the separating clutch 43 is closed and the clutch 48 is opened.

In addition it is possible to use the electric machine 40 as a maneuvering aid or driving-off aid. In this case, the friction clutch 14 and the shift clutch 43 are opened and the shift clutch 48 is closed in order to drive the vehicle by means of the electric machine 40 for the purpose of maneuvering or driving off or to hold it on a gradient ("hill holder").

Apart from this, the electric machine 40 can also be used for damping vibrations of the drive train.

The above description of the functions of the first embodiment of the drive train 10 according to the invention can also be applied to the embodiments of the drive train according to the invention which are described below. Unless it is expressly stated otherwise, the description of the drive train 10 is also intended in this respect to refer to the drive trains described below. Consequently, in the following description identical elements are also provided with the same reference numbers as in the case of the drive train 10. In each case only the differences compared to the drive train 10 are explained.

The embodiments of the drive train according to the invention which are described below present advantageous solutions which allow the basic concept of the drive train 10 to be implemented particularly favorably in terms of design, in particular with respect to the method of connection of the crankshaft 18 and the arrangement of the electric machine 40 or its output shaft 42 in relation to the housing of the step-by-step variable speed transmission.

Figure 2:
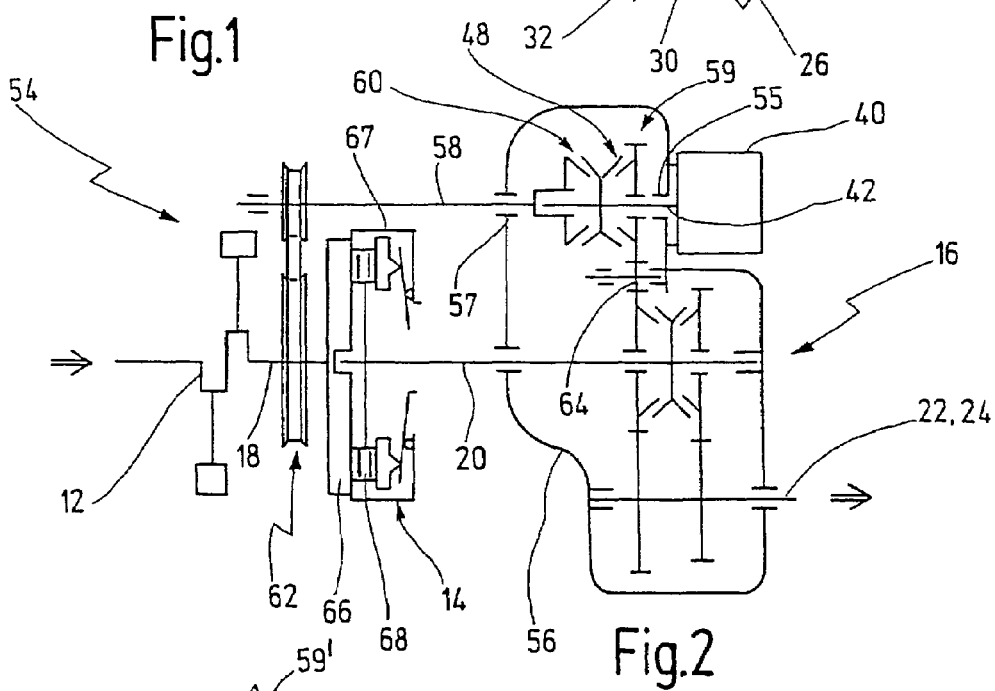
FIG. 2 shows the schematic layout of a second embodiment of the drive train according to the invention.

In FIG. 2, a second embodiment of the drive train according to the invention is generally designated by 54.

The housing of the step-by-step variable speed transmission 16 is shown in FIG. 2 at 56. It is to be noted that the electric machine 40 is connected by flanges to the outside of the housing 56, the output shaft 42 being led into the interior of the housing 56 via a shaft seal 55.

A secondary shaft 58 which is provided as an extension of the output shaft 42 extends from the interior of the housing 56 out of the other end of the housing 56 via a shaft seal 57.

The secondary shaft 58 extends here parallel to the transmission input shaft 20 and passes the friction clutch 14.

The step-by-step variable speed transmission 16 is embodied in the illustrated embodiment as a transverse transmission, the countershaft 24 simultaneously forming the output shaft 22 of the step-by-step variable speed transmission 16.

In the illustrated embodiment, the part of the secondary shaft 58 which projects out of the housing 56 is connected fixed in terms of rotation to the crankshaft 18 of the internal combustion engine 12 via a belt drive 62.

The output shaft 42 of the electric machine 40 is connected to the output shaft 22 of the step-by-step variable speed transmission 16 via a wheel set 59 which can be shifted by means of the shift clutch 48.

The wheel set 59 has a gearwheel (not designated in more detail) which is rotatably mounted on the output shaft 42 of the electric machine 40, a gearwheel which is rotatably mounted on the transmission input shaft 20 and a gearwheel which is secured so as to be fixed in terms of rotation to the output shaft 22.

In addition, an intermediate gearwheel 64 is provided in order to reverse the direction of rotation.

The output shaft 42 of the electric machine 40 can also be connected to the secondary shaft 58 by means of a shift clutch 60.

The clutches 48 and 60 are embodied as a shifting package, with the output shaft 42 idling in a central position of a shifting sleeve (not designated in more detail) and being connected neither to the secondary shaft 58 nor to the transmission output shaft 22.

In addition, the friction clutch 14 is presented with a greater degree of precision in FIG. 2. The friction clutch 14 has a flywheel 66 which is connected fixed in terms of rotation to the crankshaft 18. A clutch plate 68 is connected fixed in terms of rotation to the transmission input shaft 20. In a known fashion, the clutch plate 68 is pressed against the flywheel 66 by means of a disk spring or the like, with the disk spring being mounted on a clutch basket 67.

The drive train 10 according to the invention is preferably embodied as an automated drive train, with the activation operations for the various clutches 14, 43, 48, 32, 60 being carried out by means of suitable actuators controlled by a control device (not designated in more detail).

As a result of the clutches 48, 60 being arranged in the interior of the transmission housing 56, these clutches can be constructed in a similar way to the shift clutches 32 for engaging and disengaging the gear speeds of the step-by-step variable speed transmission 16. As a result of the electric machine 40 being arranged outside the transmission housing 56, a conventional electric machine can be used without particular encapsulation.

Figure 3:
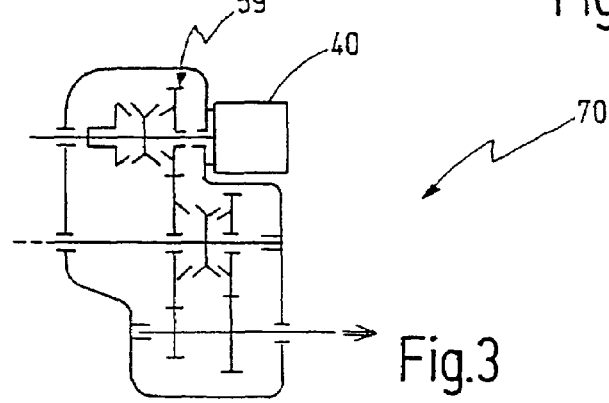
FIG. 3 shows a modification of the second embodiment of the drive train according to the invention.

A modification of the drive train 54 in FIG. 2 is designated generally by 70 in FIG. 3.

The wheel set 59' does not have an intermediate gearwheel 64 for reversing the direction of rotation in this modification.

Figure 4:
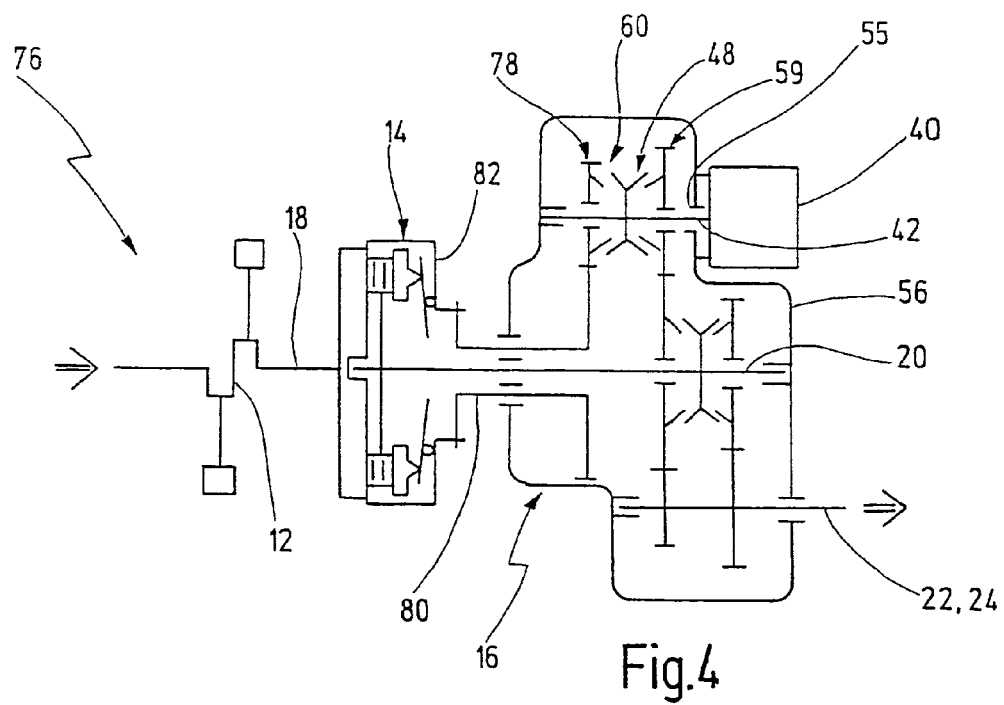
FIG. 4 shows the schematic layout of a third embodiment of the drive train according to the invention.

FIG. 4 shows a third embodiment of a drive train 76 according to the invention.

In the drive train 76, the output shaft 42, extending into the interior of the transmission housing 56, of the electric machine 40 can be connected to a secondary shaft 80 in the form of a hollow shaft via a wheel set 78. In this embodiment, the hollow shaft 80 is connected fixed in terms of rotation to the clutch basket 82, and consequently fixed in terms of rotation to the crankshaft 18.

The transmission input shaft 20 extends through the hollow shaft 80.

This embodiment has the advantage in comparison with the drive train 54 that the connection between the output shaft 42 of the electric machine 40 and the crankshaft 18 is made via a rotational element (in the form of the hollow shaft 80) which is arranged concentrically with respect to the transmission input shaft 20. Consequently, the installation space can be kept small in the radial direction. There is no need for a shaft leading past the friction clutch 14 on the outside.

Figure 5:
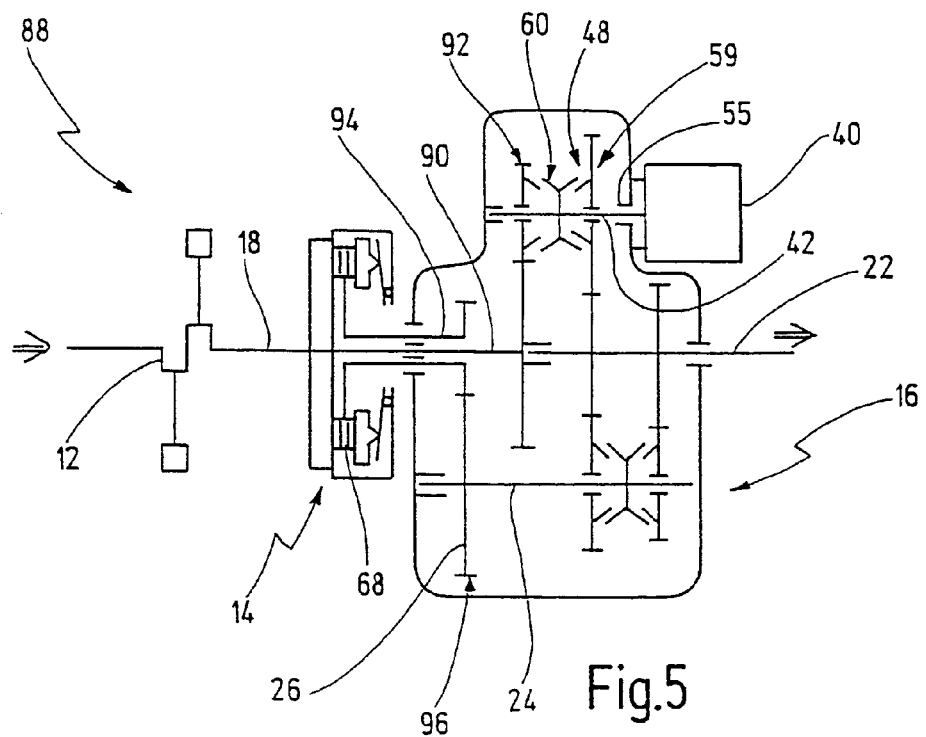
FIG. 5 shows the schematic layout of a fourth embodiment of the drive train according to the invention.

FIG. 5 shows a further alternative embodiment of a drive train 88 according to the invention.

In this embodiment, the output shaft 42 of the electric machine 40 is connected via a wheel set 92 to a secondary shaft 90 which is connected fixed in terms of rotation to the crankshaft 18 as an extension of said crankshaft 18. In this embodiment, the transmission input shaft 94 is embodied as a hollow shaft and surrounds the secondary shaft 90.

The transmission input shaft 94 is connected to the countershaft 24 of the step-by-step variable speed transmission via a constant wheel set 96. The step-by-step variable speed transmission 16 in this embodiment is embodied with a longitudinal design.

In this embodiment it is also advantageous that the output shaft 42 of the electric machine 40 can be connected to the crankshaft 18 via a rotational element (shaft 90) which is arranged concentrically with respect to the transmission input shaft 94. In this respect, in this embodiment also there is no need for a shaft surrounding the friction clutch 14.

Figure 6:
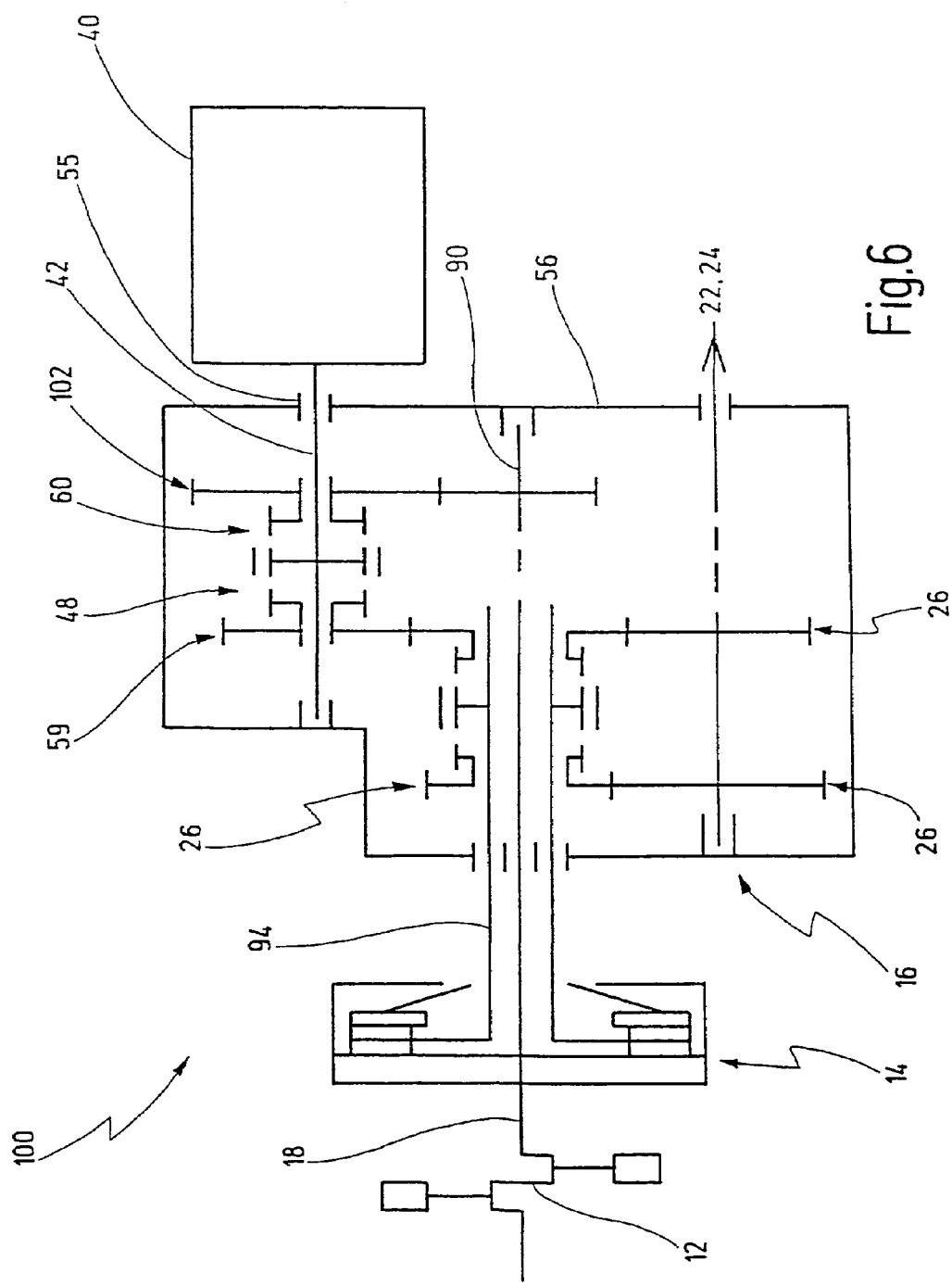
FIG. 6 shows the schematic layout of a fifth embodiment of the drive train according to the invention.

FIG. 6 shows a fifth embodiment of the drive train 100 according to the invention.

In this embodiment, the secondary shaft 90 which is connected fixed in terms of rotation to the crankshaft 18 extends over the entire axial length of the step-by-step variable speed transmission 16 and can be connected to the output shaft 42 of the electric machine 40 via a wheel set 102 which is arranged at the output end of the housing 56. The wheel sets 26 of the step-by-step variable speed transmission 16 are arranged on the transmission input shaft 94 which is embodied as a hollow shaft.

In contrast, in the drive train 88 in FIG. 5 the connecting wheel set 92 is mounted at the transmission input end, and the wheel sets 26 are mounted on the transmission output shaft 22 or on the countershaft 24.

Figure 7:
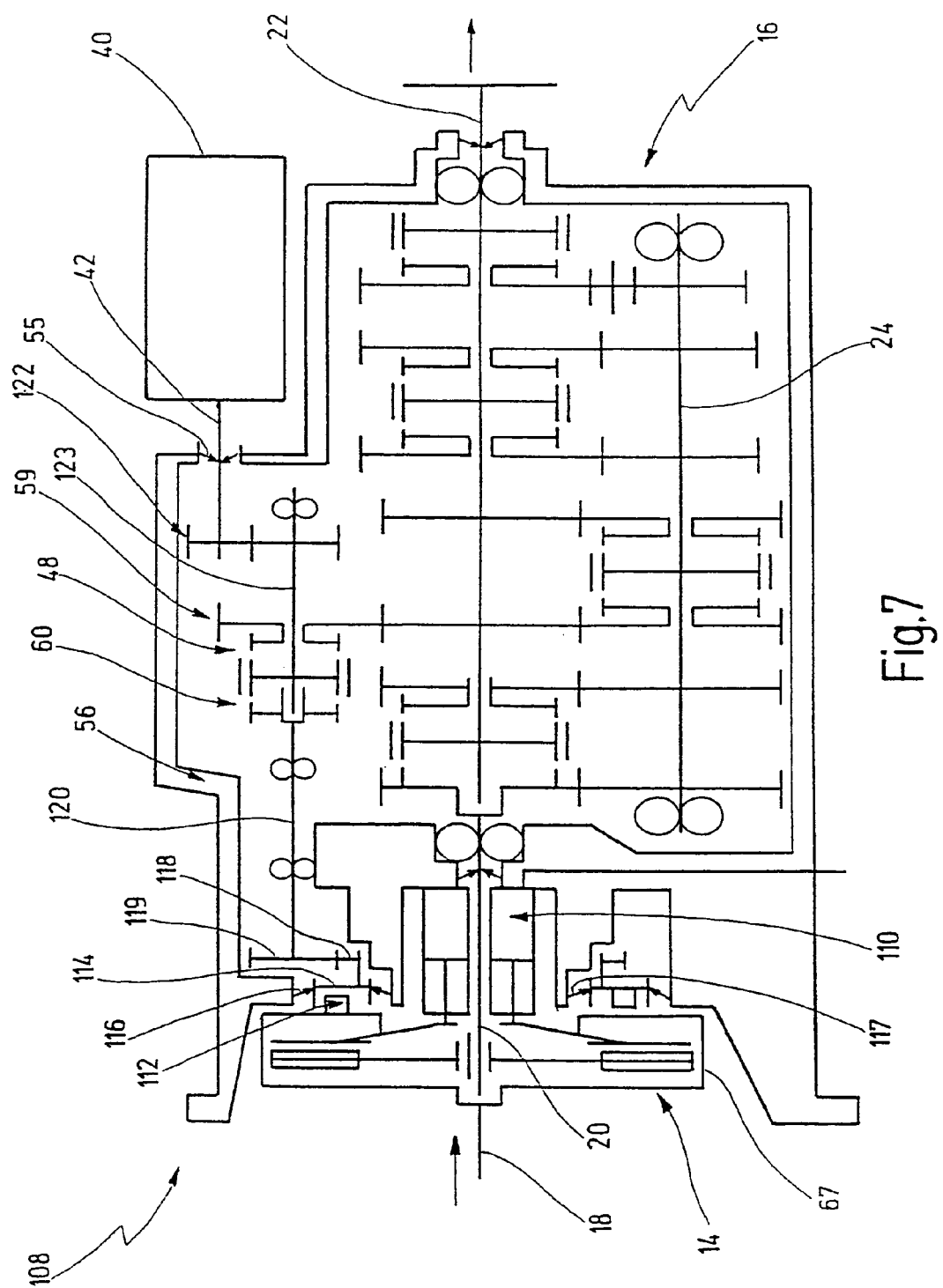
FIG. 7 shows the schematic layout of a sixth embodiment of the drive train according to the invention.

FIG. 7 shows a sixth embodiment of the drive train 108 according to the invention.

In the illustration of the drive train in FIG. 7, it is apparent that a clutch actuator 110 is arranged between the friction clutch 14 and the housing 56 of the step-by-step variable speed transmission 16, and specifically is arranged concentrically with respect to the transmission input shaft 20.

In order to connect the crankshaft 18 to the output shaft 42 of the electric machine 40, one or more drivers 112 are arranged on the side of the clutch basket 67 facing the step-by-step variable speed transmission 16.

The drivers 112 are in engagement with a ring gear 114 which is arranged concentrically around the clutch actuator 110 and is rotatably mounted on the housing 56 of the step-by-step variable speed transmission 16.

In this context, the ring gear 114 is sealed with respect to the transmission housing 56 by means of two shaft seals 116 and 117 and thus separates the interior of the housing 56 from the clutch side.

A gearwheel 118 which intermeshes with a gear-wheel 119 is secured to the ring gear 114. The gearwheel 119 is connected fixed in terms of rotation to a secondary shaft 120 which is arranged parallel to the transmission input shaft 20. Consequently, the secondary shaft 120 is connected fixed in terms of rotation to the crankshaft 18.

The output shaft 42 of the electric machine 40 is connected via a wheel set 122 to a second secondary shaft 123 which is arranged as an extension of the first secondary shaft 120. The shifting package composed of clutch 48 and clutch 60 is mounted on the second secondary shaft 123. The shift clutch 60 connects the secondary shafts 120, 123. The shift clutch 48 connects the secondary shaft 123 to a wheel set 59.

In this embodiment it is advantageous that the connection between the output shaft 42 of the electric machine 40 and the crankshaft 18 is made via a rotational element (a ring gear 114) which is arranged concentrically with respect to the transmission input shaft 20. However, at the same time there is no need for a hollow shaft structure in the region of the friction clutch 14 so that the friction clutch 14 can be of largely conventional design. All that needs to be provided at the clutch basket 67 are the drivers 112 which connect the clutch basket 67 to the ring gear 114 so as to be fixed in terms of rotation.

In addition, within the ring gear 114 there is sufficient installation space to accommodate the clutch actuator 110.

As a result of the second secondary shaft 123 and the wheel set 122 being provided it is possible to make a more variable selection of the arrangement of the electric machine 40 on the transmission housing 56. However, it is alternatively also possible for the clutches 48, 60 to be mounted directly on the output shaft 42 of the electric machine 40.

Figure 8:
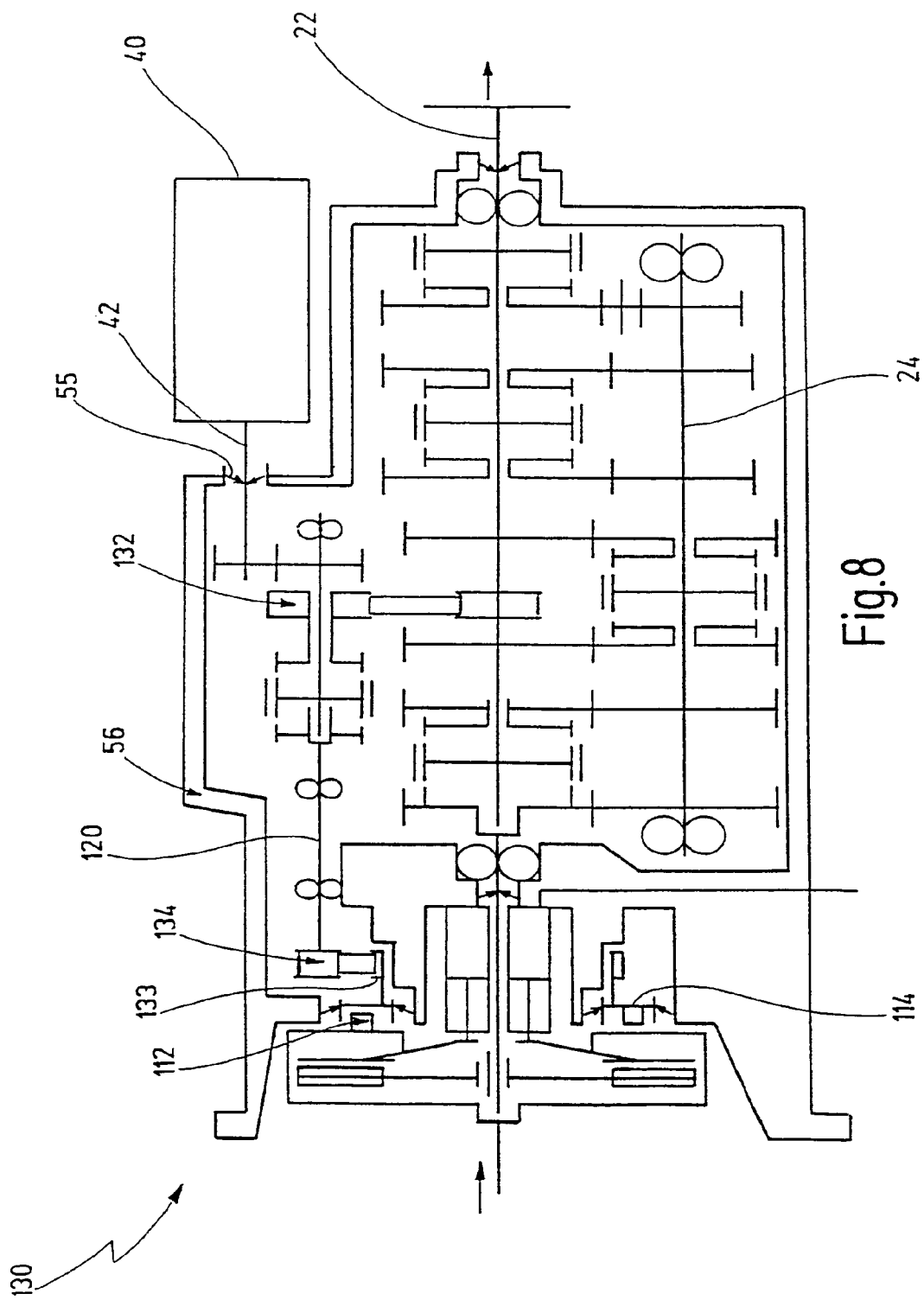
FIG. 8 shows the schematic layout of a seventh embodiment of the drive train according to the invention.

FIG. 8 shows a seventh embodiment of the drive train 130 according to the invention which is largely identical to the drive train 108 in FIG. 7.

In the drive train 130, the ring gear 114 is provided with a belt pulley 133 and is connected to the secondary shaft 120 via a belt drive 134. Instead of the wheel set 59, a belt output, designated generally by 132 in FIG. 8, is also provided.

What is claimed is:

1. A drive train for a motor vehicle which is driven by an internal combustion engine, having:

a first single friction clutch which has an input element and an output element, wherein the input element is to be connected to a crankshaft of the internal combustion engine;

a step-by-step variable speed transmission which has an input shaft, a multiplicity of wheel sets corresponding to a multiplicity of gear speeds, and an output shaft, wherein the input shaft is connected to the output element of the first clutch; and an electric machine configured to be connected via a second clutch to the output shaft of the step-by-step variable speed transmission in order to be able to apply traction force to the output shaft of the step-by-step variable speed transmission independently of whether the first clutch is opened or closed, and configured as a starter generator when connected via a third clutch to the crankshaft in order to start the internal combustion engine or be driven by the internal combustion engine;

wherein the electric machine can be rotationally coupled to the crankshaft while bypassing the first clutch so as to start the internal combustion engine or be driven by the internal combustion engine when the first clutch is opened.

2. The drive train as claimed in claim 1, wherein the electric machine is arranged outside a housing of the stepby-step variable speed transmission and has an output shaft which extends into the interior of the housing via a shaft seal.

3. The drive train as claimed in claim 2, wherein the output shaft of the electric machine is arranged parallel to the output shaft of the step-by-step variable speed transmission.

4. The drive train as claimed in claim 3, wherein the output shaft of the electric machine is configured to be connected to the output shaft of the step-by-step variable speed transmission via a wheel set and the second clutch, the second clutch being a shift clutch.

5. The drive train as claimed in claim 4, wherein the shift clutch is a synchronized clutch.

6. The drive train as claimed in claim 1, wherein the output shaft of the electric machine is arranged parallel to the crankshaft of the internal combustion engine.

7. The drive train as claimed in claim 1, wherein the output shaft of the electric machine is configured to be connected to the crankshaft via the third clutch, wherein the third clutch is a shift clutch, and wherein the third clutch is arranged inside the housing of the step-by-step variable speed transmission.

8. The drive train as claimed in claim 1, wherein the connection between the output shaft of the electric machine and the crankshaft is made via a shaft which is arranged parallel to the input shaft of the step-by-step variable speed transmission.

9. The drive train as claimed in claim 1, wherein the connection between the output shaft of the electric machine and the crankshaft is made via a rotational element which is arranged concentrically with respect to the input shaft of the step-by-step variable speed transmission.

10. The drive train as claimed in claim 9, wherein the rotational element is embodied as a hollow shaft which is connected to the input shaft of the friction clutch and is arranged around the input shaft of the step by step variable speed transmission.

11. The drive train as claimed in claim 9, wherein the input shaft of the step by step variable speed transmission is embodied as a hollow shaft, and wherein the rotational element is mounted as a shaft inside the input shaft.

12. The drive train as claimed in claim 9, wherein the rotational element is embodied as a ring gear which is sealed with respect to the housing of the step-by-step variable speed transmission by means of shaft seals, and is connected fixed in terms of rotation to the crankshaft by means of at least one driver which is connected to the input element of the first clutch.

13. The drive train as claimed in claim 12, wherein the connection between the output shaft of the electric machine and the ring gear is made via at least one flexible drive mechanism.

14. The drive train as claimed in claim 1, wherein the output shaft of the electric machine can be alternatively connected to the crankshaft or the output shaft of the step-by-step variable speed transmission by means of a clutch package.

15. The drive train as claimed in claim 14, wherein the clutch package can additionally be switched into the idling state so that the output shaft of the electric machine idles.

16. A method for starting an internal combustion engine of a motor vehicle and for initiating the driving off of the motor vehicle, wherein the crankshaft of the internal combustion engine is connected to an input element of a first clutch of a drive train, the output element of the first clutch being connected to an input shaft of a step-by-step variable speed transmission, and wherein the drive train has an electric machine which is configured to be connected beth to the output shaft of the step-by-step variable speed transmission via a second clutch and directly to the crankshaft via a third clutch, the method having the steps which take place in response to a start request signal:
  a) connection of the electric machine to the crankshaft with the third clutch while bypassing the first clutch;
  b) opening of the first clutch if it is not yet opened;
  c) engagement of a gear speed of the step-by-step variable speed transmission which is suitable for driving off if said gear speed has not yet been engaged;
  d) starting up of the electric machine so that the internal combustion engine can be started;
  e) starting of the internal combustion engine; and
  f) closing of the first clutch in order to drive off the motor vehicle.

17. A method for generating electric current by means of an electric machine which is driven by an internal combustion engine of a motor vehicle, while the motor vehicle is stationary, wherein the crankshaft of the internal combustion engine is connected to an input element of a first clutch of a drive train, the first clutch being a single friction clutch and the output element of the first clutch being connected to an input shaft of a step-by-step variable speed transmission, and wherein the drive train has an electric machine which is configured to be connected to the output shaft of the step-by-step variable speed transmission via a second clutch and directly to the crankshaft via a third clutch, the method having the steps:
  i) opening of the first clutch if it is not yet opened;
  ii) engagement of a gear speed of the step-by-step variable speed transmission which is suitable for driving off if said gear speed has not yet been engaged;
  iii) connection of the electric machine to the crankshaft with the third clutch while bypassing the first clutch so that the electric machine operates as a generator.

* * * * *

UNITED STATES PATENT AND TRADEMARK OFFICE
CERTIFICATE OF CORRECTION

PATENT NO. : 7,367,416 B2
APPLICATION NO. : 11/112229
DATED : May 6, 2008
INVENTOR(S) : Martin Seufert et al.

It is certified that error appears in the above-identified patent and that said Letters Patent is hereby corrected as shown below:

In Col. 9, line 11, Delete "crank-shaft" and insert -- crankshaft --, therefor.

In Col. 11, line 65, Delete "gear-wheel" and insert -- gearwheel --, therefor.

In Col. 13, line 21, In Claim 7, before "and" delete "clutch," and insert -- clutch --, therefor.

In Col. 14, line 16, In Claim 16, after "connected" delete "beth".

Signed and Sealed this

Sixteenth Day of June, 2009

JOHN DOLL
*Acting Director of the United States Patent and Trademark Office*